US009210626B2

United States Patent
Hsu

(10) Patent No.: US 9,210,626 B2
(45) Date of Patent: Dec. 8, 2015

(54) METHOD OF ANALYZING NON-ACKNOWLEDGEMENT OF A NETWORK IN RESPONSE TO MEASUREMENT REPORTS

(71) Applicant: ACER INCORPORATED, New Taipei (TW)

(72) Inventor: Jin-Jia Hsu, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 50 days.

(21) Appl. No.: 14/018,441

(22) Filed: Sep. 5, 2013

(65) Prior Publication Data

US 2014/0066070 A1 Mar. 6, 2014

(30) Foreign Application Priority Data

Sep. 5, 2012 (TW) ................ 101132315 A

(51) Int. Cl.
*H04W 36/00* (2009.01)
*H04W 72/08* (2009.01)
*H04W 24/10* (2009.01)

(52) U.S. Cl.
CPC .......... *H04W 36/0083* (2013.01); *H04W 24/10* (2013.01); *H04W 72/085* (2013.01)

(58) Field of Classification Search
CPC ..... H04W 24/10; H04W 24/02; H04W 64/00; H04W 36/32; H04W 72/02; H04W 36/0083; H04W 72/085; H04W 28/0268; H04W 36/30
USPC .................................................. 455/436–437
See application file for complete search history.

(56) References Cited

U.S. PATENT DOCUMENTS

| 6,721,564 | B1* | 4/2004 | Kobayashi | 455/436 |
|---|---|---|---|---|
| 2007/0054675 | A1* | 3/2007 | Duan | 455/456.2 |
| 2008/0139114 | A1* | 6/2008 | Ranganathan | 455/41.1 |
| 2009/0036142 | A1* | 2/2009 | Yan | 455/456.1 |
| 2012/0315919 | A1* | 12/2012 | Hirsch | 455/456.1 |
| 2014/0066065 | A1* | 3/2014 | Goyal | 455/436 |

FOREIGN PATENT DOCUMENTS

TW 201112802 4/2011

* cited by examiner

*Primary Examiner* — Daniel Lai
(74) *Attorney, Agent, or Firm* — Winston Hsu; Scott Margo

(57) ABSTRACT

In a wireless communication system, a user equipment is configured to repeatedly send a measurement report associated with updating active set to a network and records mobility information before receiving a corresponding acknowledgement message from the network. After having sent the measurement report over a predetermined period of time, the user equipment is then configured to analyze the mobility information.

8 Claims, 1 Drawing Sheet

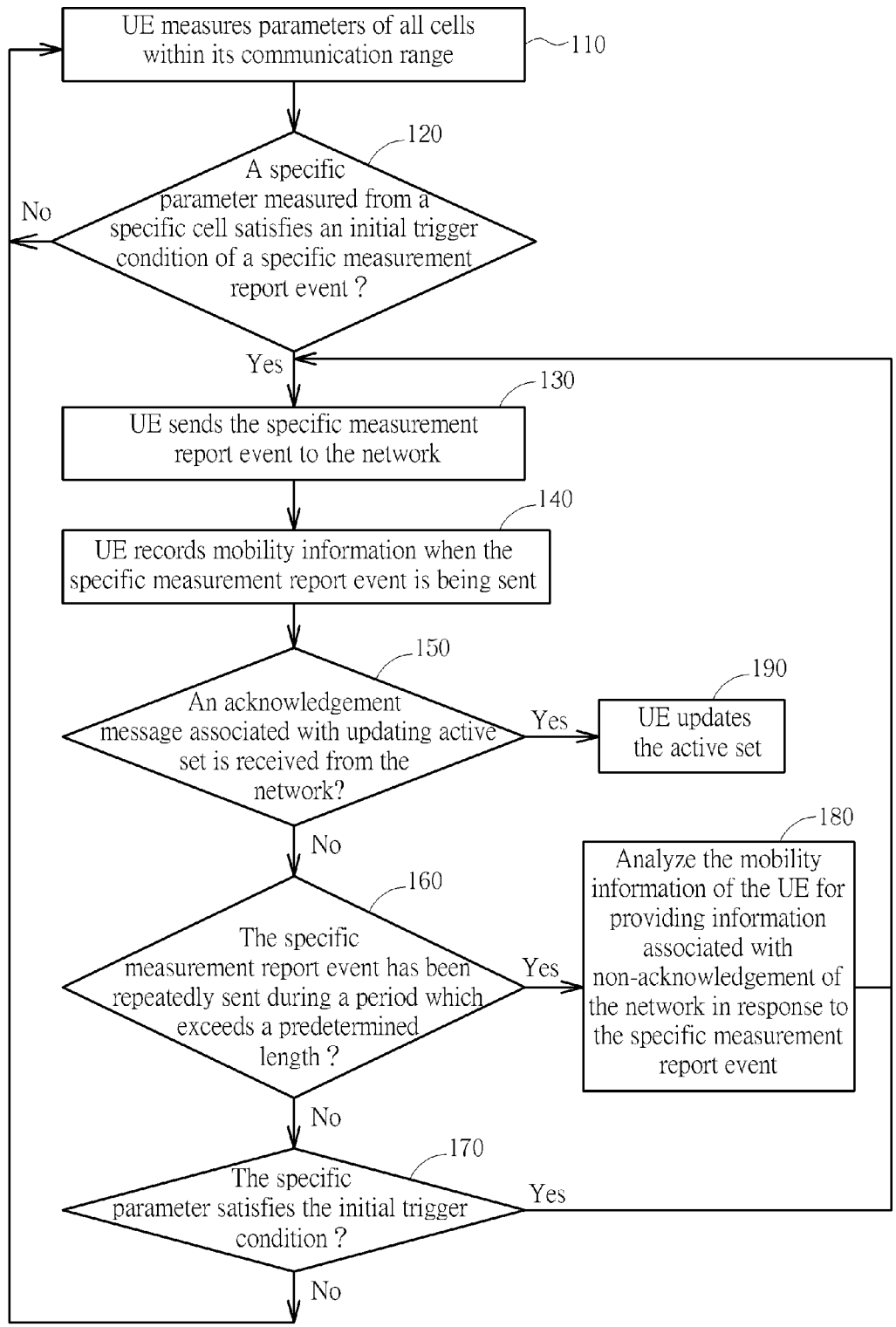

METHOD OF ANALYZING NON-ACKNOWLEDGEMENT OF A NETWORK IN RESPONSE TO MEASUREMENT REPORTS

BACKGROUND OF THE INVENTION

1. Field of the Invention

The present invention is related to a method of analyzing measurement report events, and more particularly, to a method of analyzing non-acknowledgement of a network in response to measurement reports.

2. Description of the Prior Art

In a Universal Mobile Telecommunication System (UMTS) defined by the third Generation Partnership Project (3GPP), mobility management mainly includes cell selection/reselection, handover and related measurements. Handover refers to the transfer process of management from a current serving cell to a target cell and is performed in all cellular mobile communication systems. There are two types of handover: hard handover and soft handover. Hard handover may be performed in all non-CDMA (code division multiple access) systems. For example, in a time division multiple access (TDMA) system, the current connection is broken before making a new connection to the target cell. Such break-before-make hard handover only requires simple hardware structure, but suffers from high call drop rate. Soft handover may be performed in all CDMA systems which adopt orthogonal codes and rake receivers. Such make-before-break soft handover can reduce call drop rate during handover, but requires more complicated hardware structure or algorithm.

The cells around a user equipment (UE) can be categorized in 3 different sets: active set, candidate set and monitored set. A cell of the active set is configured to establish connection with a mobile device during handover. A cell of the candidate set does not establish connection with a mobile device during handover, but its signal quality is qualified to be included in the active set. A cell of the monitored set does not have signal quality qualified to be included in the active set. The UE is configured to measure the signals of all cells within its communication range and perform handover accordingly. Soft handover includes three major modes: radio link addition, radio link removal, and radio link replacement. The decision of whether a cell belongs to the active set or the monitored set is made by the UE. According to corresponding trigger conditions, the UE may add an unconnected cell into the active set or remove a connecting cell from the active set.

The network is configured to send measurement criteria to the UE via broadcast control channel (BCCH) for managing handover, radio bearer control (RBC) and positioning. The UE is then configured to evaluate whether the signals of the cells in the active set and the monitored set satisfy trigger conditions according the parameters provided by the network. The radio network controller (RNC) is notified when a trigger condition is satisfied for determining whether a corresponding handover should be performed.

When detecting a cell with better signal quality, the UE may send a corresponding measurement report event for updating the active set. However, the network may not be able to respond to the measurement report event for some reason, such as due to transmission failure or lack of storage space. Without the notification of updating the active set from the network, the UE may keep sending the same measurement report event for a while and fail to perform the appropriate handover. If the signal quality of the current cell somehow degrades and results in call drop, the user is unable to know the cause of communication failure.

SUMMARY OF THE INVENTION

The present invention provides a method of analyzing a non-acknowledgement of a network in response to measurement report events. The method includes a user equipment measuring parameters of a plurality of cells; determining whether a specific parameter measured from a specific cell among the plurality of cells satisfies an initial trigger condition of a specific measurement report event; before receiving an acknowledgement message from the network, the user equipment repeatedly sending the specific measurement report event to the network and recording mobility information each time when the specific measurement report event is sent to the network; and the UE analyzing the mobility information for providing information associated with the non-acknowledgement of the network in response to the specific measurement report event after the measurement report event has been repeatedly sent during a period which exceeds a predetermined length.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a flowchart illustrating a method of analyzing a non-acknowledgement a network in response to measurement report events for determining the cause of call drop according to the present invention.

DETAILED DESCRIPTION

The FIGURE is a flowchart illustrating a method of analyzing a non-acknowledgement a network in response to measurement report events for determining the cause of call drop according to the present invention. The flowchart in the figure includes the following steps:

Step 110: a UE measures parameters of all cells within its communication range; execute step 120.

Step 120: the UE determines whether a specific parameter measured from a specific cell satisfies an initial trigger condition of a specific measurement report event; if yes, execute step 130; if no, execute step 110.

Step 130: the UE sends the specific measurement report event to the network; execute step 140.

Step 140: the UE records mobility information when the specific measurement report event is being sent; execute step 150.

Step 150: the UE determines whether an acknowledgement message associated with updating active set is received from the network; if yes, execute step 190; if no, execute step 160.

Step 160: determine if the specific measurement report event has been repeatedly sent during a period which exceeds a predetermined length; if yes, execute step 170; if no, execute step 130.

Step 170: determine if the specific parameter satisfies the initial trigger condition; if yes, execute step 130; if no, execute step 110.

Step 180: analyze the mobility information of the UE for providing information associated with non-acknowledgement of the network in response to the specific measurement report event; execute step 130.

Step 190: the UE updates the active set.

In the radio resource control (RRC) protocol specifications established by 3GPP, UE measurement report events may include intra-frequency measurement, inter-frequency measurement, inter-RAT measurement, traffic volume measurement, UE internal measurement, UE positioning measurement, and random access channel (RACH) measurement, etc.

Intra-frequency measurement includes 6 measurement report events defined as follows:

Event 1A: a CPICH (common pilot channel) enters the reporting range (associated with radio link addition);

Event 1B: a CPICH leaves the reporting range (associated with radio link removal);

Event 1C: a non-active primary CCPCH becomes better than an active primary CCPCH (associated with radio link replacement);

Event 1D: change of best cell;

Event 1E: a primary CCPCH becomes better than an absolute threshold; and

Event 1F: a primary CCPCH becomes worse than an absolute threshold.

Inter-frequency measurement includes 6 reporting events defined as follows:

Event 2A: change of best frequency;

Event 2B: the estimated quality of the currently used frequency is below a certain threshold and the estimated quality of a non-used frequency is above a certain threshold;

Event 2C: the estimated quality of a non-used frequency is above a certain threshold;

Event 2D: the estimated quality of the currently used frequency is below a certain threshold;

Event 2E: the estimated quality of a non-used frequency is below a certain threshold; and Event 2F: the estimated quality of the currently used frequency is above a certain threshold.

Inter-RAT measurement includes 4 reporting events defined as follows:

Event 3A: the estimated quality of the currently used UTRAN (universal terrestrial radio access network) frequency is below a certain threshold and the estimated quality of the other system is above a certain threshold;

Event 3B: the estimated quality of other system is below a certain threshold;

Event 3C: the estimated quality of other system is above a certain threshold.

Event 3D: change of best cell in other system

Traffic volume measurement includes 2 reporting events defined as follows:

Event 4A: transport channel traffic volume exceeds an absolute threshold; and

Event 4B: transport channel traffic volume becomes smaller than an absolute threshold.

Quality measurement includes 1 reporting event defined as follows:

Event 5A: a predefined number of bad cycle redundancy checks (CRCs) is exceeded.

UE internal measurement includes 7 reporting events defined as follows:

Event 6A: the UE transmitting power becomes larger than an absolute threshold;

Event 6B: the UE transmitting power becomes less than an absolute threshold;

Event 6C: the UE transmitting power reaches its minimum value;

Event 6D: the UE transmitting power reaches its maximum value;

Event 6E: the UE received signal strength indicator (RSSI) reaches the UE's dynamic receiver range;

Event 6F: the UE receiving-transmitting time difference becomes larger than an absolute threshold; and Event 6G: the UE receiving-transmitting time difference becomes smaller than an absolute threshold.

Related parameters and initial trigger conditions of each measurement report event are described in related 3GPP specifications (such as 3GPP TS 25.331). In step 110, the specific parameter may be the primary CPICH of the cells within UE's communication range. In step 120, the specific measurement report event maybe associated with updating the active set, such as measurement report event 1A or 1C.

When the specific parameter measured from the specific cell satisfies the initial trigger condition of the specific measurement report event, the UE is configured to send the specific measurement report event to the network in step 130 and record its mobility information in step 140. For example, the UE may record its current location and the current time when the specific measurement report event is being sent.

If the UE is able to confirm the receiving of the acknowledgement message from the network in step 150, the UE is configured to updates the active set in step 190. For example, the UE may add an unconnected cell in the monitored set into the active set when the signal quality of the unconnected cell has entered the reporting range (reporting event 1A) or becomes better than that of a cell in the active set (reporting event 1C).

If the UE is unable to confirm the receiving of the acknowledgement message from the network in step 150, step 130 is then executed for resending the specific measurement report event to the network when it is determined in step 160 that the specific measurement report event has been repeatedly sent during a period which exceeds the predetermined length and when it is determined in step 170 that the specific parameter satisfies the initial trigger condition.

If the UE is unable to confirm the receiving of the acknowledgement message from the network in step 150, step 110 is then executed for re-measuring parameters of all cells within the UE's communication range when it is determined in step 160 that the specific measurement report event has not been repeatedly sent during a period which exceeds the predetermined length and when it is determined in step 170 that the specific parameter does not satisfy the initial trigger condition.

If the UE is unable to confirm the receiving of the acknowledgement message from the network in step 150, step 180 is then executed for analyzing the mobility information of the UE for providing information associated with non-acknowledgement of the network in response to the specific measurement report event when it is determined in step 160 that the specific measurement report event has been repeatedly sent during a period which exceeds the predetermined length.

In the above-mentioned embodiment, the measurement report events 1A and 1C of the intra-frequency measurement are used for illustrative purpose, but do not limit the scope of the present invention. The present invention may be applied to any measurement report event associated with updating the active set.

In the present invention, the UE is configured to repeatedly send a measurement report event associated with updating active set to the network and records its mobility information before receiving a corresponding acknowledgement message from the network. After the measurement report event has been repeatedly sent during a period which exceeds a predetermined length, the UE is then configured to analyze the mobility information, thereby providing the UE location and the time associated with non-acknowledgement of the network in response to the measurement report event. If the signal quality of the current cell somehow degrades and results in call drop, the user is able to know that the handover failure caused by non-acknowledgement of the network in response to the measurement report event is a possible cause of communication failure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of analyzing a non-acknowledgement of a network in response to measurement report events, comprising:
    a user equipment measuring parameters of a plurality of cells;
    determining whether a specific parameter measured from a specific cell among the plurality of cells satisfies an initial trigger condition of a specific measurement report event;
    before receiving an acknowledgement message from the network, the user equipment repeatedly sending the specific measurement report event to the network and recording mobility information each time when the specific measurement report event is sent to the network; and
    the user equipment analyzing the mobility information for providing information associated with the non-acknowledgement of the network in response to the specific measurement report event after the measurement report event has been repeatedly sent during a period which exceeds a predetermined length, wherein the mobility information includes:
        locations of the user equipment each time the specific measurement report event is sent to the network; and
        time of sending the specific measurement report event to the network.

2. The method of claim 1, wherein:
    the specific measurement report event is associated with updating an active set; and
    the acknowledgement message is associated with a handover of updating the active set.

3. The method of claim 2, wherein:
    the specific cell is included in a monitored set;
    the specific measurement report event is associated with a handover to perform a radio link addition to or a radio link replacement of the active set; and
    the user equipment measuring the parameters of the plurality of cells includes the user equipment measuring a primary common pilot channel of the specific cell.

4. The method of claim 2, wherein:
    the specific cell is included in an active set;
    the specific measurement report event is associated with a handover to perform a radio link removal from the active set; and
    the user equipment measuring the parameters of the plurality of cells includes the user equipment measuring a primary common pilot channel of the specific cell.

5. The method of claim 2, further comprising:
    the user equipment updating the active set according to the acknowledgement message after receiving the acknowledgement message from the network.

6. The method of claim 1, wherein the user equipment repeatedly sending the specific measurement report event to the network is the user equipment periodically sending the specific measurement report event to the network.

7. The method of claim 1, further comprising:
    before receiving the acknowledgement message from the network, the user equipment repeatedly sending the specific measurement report event to the network as long as the specific parameter satisfies the initial trigger condition.

8. The method of claim 1, further comprising:
    before receiving the acknowledgement message from the network, the user equipment re-measuring the parameters of the plurality of cells when it is determined that the specific parameter does not satisfy the initial trigger condition.

* * * * *